United States Patent

Kriesche et al.

[11] Patent Number: 5,565,545
[45] Date of Patent: Oct. 15, 1996

[54] PROCESS FOR ADJUSTING THE HAZE OF ETHYLENETEREPHTHALATE POLYMERS

[75] Inventors: Gerald Kriesche, Roedermark; Ulrich Thiele, Bruchkoebel, both of Germany

[73] Assignee: Zimmer Aktiengesellschaft, Germany

[21] Appl. No.: 389,140

[22] Filed: Feb. 15, 1995

[30] Foreign Application Priority Data

Sep. 15, 1994 [DE] Germany ............................ 44 32 839.7

[51] Int. Cl.⁶ .................................................. C08G 63/85
[52] U.S. Cl. ........................ 528/285; 528/280; 528/283; 528/287; 528/301; 528/302; 528/308; 528/308.3; 528/308.6
[58] Field of Search ...................... 528/272, 283, 528/285, 280, 287, 301, 302, 308, 308.6, 308.3

[56] References Cited

U.S. PATENT DOCUMENTS

| | | | |
|---|---|---|---|
| 3,795,639 | 3/1974 | Chimura et al. | 528/283 |
| 3,803,097 | 4/1974 | Lazarus et al. | 528/285 |
| 3,932,345 | 1/1976 | Champlin | 523/333 |
| 3,951,905 | 4/1976 | Sano et al. | 524/399 |
| 4,001,187 | 1/1977 | Itabashi et al. | 528/280 |
| 4,133,800 | 1/1979 | Taubinger et al. | 524/430 |
| 4,205,157 | 5/1980 | Duh | 528/272 |
| 4,408,004 | 10/1983 | Pengilly | 524/398 |
| 4,476,272 | 10/1984 | Pengilly | 524/398 |
| 4,499,226 | 2/1985 | Massey et al. | 524/382 |
| 4,535,118 | 8/1985 | Pengilly | 524/398 |
| 4,609,721 | 9/1986 | Kirshenbaum et al. | 528/285 |
| 5,243,022 | 9/1993 | Kim et al. | 528/308.8 |
| 5,262,513 | 11/1993 | Tanaka et al. | 528/272 |
| 5,286,836 | 2/1994 | Park et al. | 528/275 |

*Primary Examiner*—Samuel A. Acquah
*Attorney, Agent, or Firm*—Banner & Allegretti, Ltd.

[57] ABSTRACT

Process for adjusting the haze value of ethylene terephthalate homopolymers and low-modified copolymers to a value in the range of 0.5 to 20 NTU while they are being produced by direct esterification and polycondensation, where an amount of antimony and germanium catalyst that is determined on the basis of the desired degree of turbidity is added before or at the start of the esterification step in the absence of other catalysts and other compounds that would affect the haze value, and after achieving a conversion of 90 to 98%, another dose of antimony catalyst corresponding to a total added amount of Sb+Ge in the range of 160 to 350 ppm is added, and then after addition of the catalyst is concluded, a phosphorus stabilizer is added to the reaction mixture in an amount to correspond to 0 to 50 ppm phosphorus.

6 Claims, No Drawings

PROCESS FOR ADJUSTING THE HAZE OF ETHYLENETEREPHTHALATE POLYMERS

BACKGROUND OF THE INVENTION

The present invention concerns a process for adjusting a desired haze value of ethylene terephthalate polymers in the range of 0.5 to 20 NTU during synthesis by direct esterification and polycondensation without adding particles that are insoluble in the polyester.

THE PRIOR ART

It has long been known that antimony and/or germanium compounds can be used as catalysts and phosphorus compounds can be used as stabilizers in synthesis of polyethylene terephthalate and its low-modified copolymers. These catalysts are added either at the start of esterification (U.S. Pat. Nos. 3,803,097, 4,609,721 and 5,235,027) or at the start of polycondensation (U.S. Pat. Nos. 3,795,639, 4,001,187, 4,205,157, 4,499,226 and 5,262,513). It is also known that a germanium catalyst can be added for esterification and an antimony catalyst can be added for polycondensation (from U.S. Pat. No. 4,133,800) or an antimony catalyst can be added for precondensation and also for polycondensation (U.S. Pat. No. 5,243,022) or a catalyst containing both antimony and titanium can be added for both esterification and polycondensation (U.S. Pat. No. 5,286,836).

If the haze value of the polyester is mentioned at all in the prior art, the lowest possible haze value is the goal, which is achieved by using germanium catalysts (U.S. Pat. No. 3,795,639), by a series of additions (U.S. Pat. No. 4,499,226) or by limiting the amount of antimony catalyst(s) in the polyester to a maximum total of 150 ppm Sb (U.S. Pat. No. 5,235,027).

Polyesters with a very high haze value are obtained by adding pigments that are insoluble in the polyester (such as U.S. Pat. No. 3,932,345) or by precipitation of such pigments during polycondensation. In this case, esterification is performed in the absence of a catalyst and polycondensation is performed in the presence of 300 to 6000 ppm Sb (in the form of an antimony compound) while at the same time precipitating antimony phosphate, for example, by adding phosphoric acid (U.S. Pat. No. 3,951,905). The haze value achieved is just as high as that achieved by adding titanium dioxide pigment, where the extent of the haze depends primarily on the particle size and the distribution of the precipitated pigments.

None of these known processes permits a controlled method of adjusting any desired given haze value, specifically no medium haze value.

SUMMARY OF THE INVENTION

The object of the present invention is to provide a method that will make it possible to adjust any predetermined haze value of ethylene terephthalate polymers during their synthesis, preferably without the use of any additional equipment needed to add pigments or requiring transitional periods when changing products. It is desired that the haze value should be adjustable to meet the requirements of different products in a single production apparatus, for example, by varying the catalyst technology in the production of ethylene terephthlate polymers for biaxially oriented film having a high haze value plus the required friction and anti-friction properties as well as for transparent packaging with a low haze value such as beverage bottles. This object should be achieved without any negative effects on any of the other properties of the polyester.

It has surprisingly been found that the haze value of ethylene terephthalate polymers is adjustable in the middle and lower ranges corresponding to 0.5 to 20 NTU, especially 0.5 to 15 NTU, depending on the amount of antimony and germanium compounds present during esterification of terephthalic acid with ethylene glycol and optionally comohomers. The haze value here can be adjusted by varying this amount as well as the ratio of the quantity amounts of antimony to germanium according to the following equation:

$$\text{Haze value in NTU} = \frac{\text{ppm Sb} - 90}{\text{ppm Ge} + 16} \cdot 1.3$$

where Sb≧110 ppm and Ge=0 to 50 ppm, each based on polyester.

It is important that at least 110 ppm antimony are present during esterification. The remaining amount of antimony is added immediately before or during the polycondensation stage (after a conversion of 90 to 98%), to provide a total catalyst amount (Sb+Ge) in the range of 160 to 350 ppm.

The influence of phosphorus stabilizers on the haze value depends on the time of addition and can be prevented by adding the stabilizer to the polycondensation step after the catalyst has been added. To adjust the color of the polyester, cobalt salts that are soluble in the polyester or soluble organic dyes may be added in a known way at any time before polycondensation is finished. However, the equation given above is valid only in the absence of other substances that would influence the haze value and/or other catalysts.

The haze value is given here in "nephelometric turbidity units" (NTU). This value is determined on a 10 wt % solution of polyester in phenol/1,2-dichlorobenzene (3:2 parts by weight) using a nephelometer. A suitable nephelometer is available from the company Hach (model XR, according to U.S. Pat. No. 4,198,161) having a cell with a diameter of 22.2 mm whereby the haze value is determined by analogy with the standard DIN 38,404, part 2 that is conventionally used for water. The intensity of the scattered light in comparison with the formazine standard solution is measured, subtracting the value for the pure solvent (approximately 0.3 NTU). Polyester with a very low haze corresponds to a value of less than 2 NTU, whereas polyester with a very high haze value (opaque) reaches a value of more than 20 NTU.

The process according to this invention is suitable for ethylene terephthalate homopolymers and copolymers produced by the direct esterification process with a total of up to 10 wt % isophthalic acid units and/or cyclohexane-1,4-dimethanol units and/or up to 5 wt % diethylene glycol units, each based on polyester. In principle, there is also a relationship between the haze value and the catalyst content in the stage of esterification with other low-modified ethylene terephthalate copolymers. However, depending on the comonomer, there may be numerical deviations from the equation given above. The intrinsic viscosity of the polymers (measured on a solution of 500 mg polyester in 100 ml of a mixture of phenol and 1,2-dichlorobenzene (3:2 parts by weight) at 25° C.) is in the range of 0.40 to 1.0 dl/g, preferably in the range of 0.55 to 0.75 dl/g.

The polyester is prepared by a known method, either continuously or discontinuously. Suitable catalysts include all antimony and germanium compounds that are soluble in the polyester, but the preferred catalysts are antimony trioxide, antimony triacetate and germanium dioxide. The dose of antimony and germanium compounds to be added to the esterification stage according to this invention may be added either to the raw materials—for example, by adding it to the terephthalic acid-ethylene glycol paste—or it may be added to the reaction mixture in the esterification reactor or the first esterification reactor. The antimony concentration in the esterification step must be at least 110 ppm, because otherwise the effect on the haze value will not be sufficient, nor will an optimum esterification reaction be possible. Together with the antimony catalyst, germanium catalysts are also used in an amount in the range of 0 to 50 ppm which is determined by the equation given above. Germanium compounds must be added at a certain very low haze value, but they can also be omitted if the haze value is higher, namely at least about 3 NTU (Ge=0 ppm). When adjusting a haze value in the range of about 1 to 7.5 NTU, the antimony concentration in the esterification step is preferably in the range of 130 to 180 ppm, especially 140 to 170 ppm, where the respective germanium concentration is calculated by the formula given according to this invention.

After achieving a conversion of 90 to 98% in the esterification step, preferably a conversion of about 95%, the one-step or multistep condensation begins. Depending on the amount of catalyst used in the esterification step, the total amount of catalyst (Sb+Ge) must be increased at this point by resupplying the antimony catalyst up to a value in the range of 160 to 350 ppm. It is important for only the amount of catalyst that corresponds to the desired haze value to be present in the esterification step, and the amount of catalyst necessary for an adequate reaction rate during polycondensation, which is usually a larger amount of catalyst, is adjusted only after conclusion of the esterification step.

The conversion achieved in the esterification step is calculated from the saponification value (SV) and the acid value (AV) of the esterification mixture, both expressed in mg KOH/g, where $$\text{degree of conversion (\%)} = \frac{SV - AV}{SV} \cdot 100$$

To determine the saponification value, the esterification mixture is saponified with 0.5N potassium hydroxide solution in 1-propanol/ethylene glycol and the excess potassium hydroxide solution is titrated back with sulfuric acid. The acid value is determined by titration with 0.1N ethanolic potassium hydroxide solution of the esterification mixture dissolved in dimethylformamide.

After resupplying the catalyst, conventional phosphorus stabilizers such as phosphoric acid and/or the esters thereof such as trimethyl phosphate, triethyl phosphate, tributyl phosphate and tris-triethylene glycol phosphate may be added to the polycondensation mixture in an amount corresponding approximately to 0 to 50 ppm phosphorus. When adding germanium catalysts, phosphorus stabilizers must be added in an amount corresponding to about 5 to 50 ppm phosphorus, where the amount of phosphorus is greater, the higher the germanium concentration. When adjusting a higher haze value ($\geq 3$ NTU) without using germanium catalysts, however, it is not necessary to add phosphorus stabilizers in all cases. It has surprisingly been found that the phosphorus stabilizer does not have a measurable effect on the haze value if it is added to the polycondensation step at a later time, namely after addition of the catalyst is complete. However, simultaneous addition or addition prior to addition of the catalyst leads to a definite increase in haze value.

After conclusion of polycondensation in the melt phase, the polyester produced according to this invention is sent for further processing to films, bottles or other hollow bodies as usual. Additional polycondensation in the solid phase can be performed before further processing, if desired.

SPECIFIC EXAMPLES

Examples 1–6

Terephthalic acid is esterified with ethylene glycol at a pressure of 1200 mbar (abs.) and a temperature of 264° C. and then is subjected to polycondensation at a pressure of 0.8 mbar (abs.) and a temperature of 280° C. until reaching an intrinsic viscosity of about 0.65 dl/g and finally it is pelletized.

Different amounts of antimony triacetate and germanium dioxide are added to the mixture of terephthalic acid and ethylene glycol (=paste) immediately before the mixture is fed into the first esterification reactor. After achieving a conversion of about 95%, another portion of antimony triacetate is added. Phosphoric acid is added as a stabilizer to the first polycondensation step immediately after the second portion of catalyst is added.

Table 1 summarizes the amounts of antimony, germanium and phosphorus compounds, each calculated as Sb, Ge and P based on polyester, as well as the analytical results obtained on the resulting polyethylene terephthalate pellets. The table lists the highest and lowest values for the haze value measured during a production period of about one day each or in the case of examples 4 and 5 about one week each. The COOH end group concentration determined by titration of a polyester solution in o-cresol/chloroform (70:30 parts by weight) with ethanolic potassium hydroxide solution is an indication of the high quality of the polyester produced by using the process according to this invention.

Example 6 is a comparative example showing that when esterification is performed without the amount of catalyst to be added for esterification according to this invention, there is no controlled adjustment of haze value.

TABLE 1

| Example No. | Esterification | | Polycondensation | | Total of Sb and Ge, ppm | Haze value | | Intrinsic viscosity dl/g | COOH end groups µeq/g |
| | ppm Sb | ppm Ge | ppm Sb | ppm P | | measured NTU | calculated NTU | | |
| --- | --- | --- | --- | --- | --- | --- | --- | --- | --- |
| 1 | 230 | — | — | — | 230 | 9–12 | 11 | 0.643 | 20–24 |
| 2 | 180 | — | 60 | — | 240 | 3–7 | 7 | 0.636 | 24 |
| 3 | 130 | — | 110 | — | 240 | 3–4 | 3.25 | 0.646 | 31 |
| 4 | 170 | 35 | — | 15 | 205 | 1.5–1.9 | 2.0 | 0.631 | 18 |
| 5 | 140 | 42 | — | 30 | 182 | 0.6–1.2 | 1.1 | 0.647 | 15 |
| 6 | — | — | 240 | — | 240 | 3–5 | — | 0.647 | 30–45 |

We claim:

1. In a process for adjusting the haze value, within the range of 0.5 to 20 NTU, of polyethylene terephthalate or its copolymers with up to a total of 10 wt % isophthalic acid and/or cyclohexane-1,4-dimethanol and/or up to 5 wt % diethylene glycol (wt % based on polyester) during their synthesis by direct esterification and polycondensation, the improvement comprising adding to the reactants, before or at the start of the esterification step, a catalyst consisting of antimony or antimony in combination with germanium in the form of their polyester-soluble compounds, the quantity of catalyst being added according to the equation $$\text{Haze value in NTU} = \frac{\text{ppm Sb} - 90}{\text{ppm Ge} + 16} \cdot 1.3$$

where Sb≧110 ppm and Ge=0 to 50 ppm, each based on polyester, carrying out the esterification step to a conversion in the range of 90 to 98%, adding enough antimony catalyst so that the total Sb and Ge content during polycondensation is in the range of 160 to 350 ppm, and after the addition of catalyst is concluded, and at the start of polycondensation, adding about 0 to 50 ppm phosphorus in the form of polyester-soluble compounds with a stabilizing effect, said reactions being carried out in the absence of other substances that would affect the haze value.

2. Process according to claim 1 in which phosphorus compounds are added in an amount to correspond to about 5 to 50 ppm phosphorus when a germanium catalyst is present.

3. Process according to claim 1 in which the germanium concentration is 0 ppm at a haze value of at least 3 NTU.

4. Process according to claim 1 in which the antimony catalyst is antimony trioxide or antimony triacetate, the germanium catalyst is germanium dioxide and the phosphorus compound is phosphoric acid or the esters thereof taken from the group consisting of trimethyl phosphate, triethyl phosphate, tributyl phosphate and tris-triethylene glycol phosphate.

5. Process according to claim 1 in which polyester-soluble cobalt salts or organic dyes are added at any time before polycondensation is completed in order to adjust the color of the polyester.

6. Process according to claim 1 in which the antimony concentration in the esterification step is in the range of 130 to 180 ppm to achieve a desired haze value in the range of about 1 to 7.5 NTU.

* * * * *